US012269051B2

(12) United States Patent
Tanaka et al.

(10) Patent No.: US 12,269,051 B2
(45) Date of Patent: Apr. 8, 2025

(54) FOAM DISPENSING CONTAINER

(71) Applicant: Daiwa Can Company, Chiyoda-ku (JP)

(72) Inventors: Eiji Tanaka, Sagamihara (JP); Susumu Sato, Sagamihara (JP); Osamu Yoshida, Sagamihara (JP)

(73) Assignee: Daiwa Can Company, Chiyoda-ku (JP)

( * ) Notice: Subject to any disclaimer, the term of this patent is extended or adjusted under 35 U.S.C. 154(b) by 320 days.

(21) Appl. No.: 17/758,004

(22) PCT Filed: Dec. 24, 2020

(86) PCT No.: PCT/JP2020/048373
§ 371 (c)(1),
(2) Date: Jun. 24, 2022

(87) PCT Pub. No.: WO2021/132440
PCT Pub. Date: Jul. 1, 2021

(65) Prior Publication Data

US 2023/0035772 A1 Feb. 2, 2023

(30) Foreign Application Priority Data

Dec. 26, 2019 (JP) ................................ 2019-236584

(51) Int. Cl.
*B05B 11/00* (2023.01)
*B05B 11/10* (2023.01)
*B05B 7/00* (2006.01)

(52) U.S. Cl.
CPC ...... *B05B 11/1087* (2023.01); *B05B 11/1092* (2023.01); *B05B 7/0037* (2013.01)

(58) Field of Classification Search
CPC .................................................. B05B 11/1087
See application file for complete search history.

(56) References Cited

U.S. PATENT DOCUMENTS 5,462,208 A * 10/1995 Stahley ................. B05B 7/0037 222/207
2019/0299228 A1* 10/2019 Ophardt .............. B05B 11/1087
(Continued)

FOREIGN PATENT DOCUMENTS

JP 4-134456 U 12/1992
JP 06-032346 U 4/1994
(Continued)

OTHER PUBLICATIONS

International Search Report issued Mar. 9, 2021 in PCT/JP2020/048373 filed on Dec. 24, 2020, 2 pages.
(Continued)

*Primary Examiner* — Donnell A Long
(74) *Attorney, Agent, or Firm* — Oblon, McClelland, Maier & Neustadt, L.L.P.

(57) ABSTRACT

A foam dispensing container includes: a cap mounted on an opening of a container containing a foamable liquid content; a nozzle having an outlet fitted onto the cap while being allowed to reciprocate; an air pump and a liquid pump reciprocated together with the nozzle; an air cylinder joined to the air pump liquid and pushing air toward the outlet in response to reciprocation of the air pump; a liquid cylinder joined to the liquid pump liquid tightly and pushing a liquid toward the outlet in response to reciprocation of the liquid pump; and a refining member arranged in the cap to form the foam by mixing the air pushed out of the air cylinder with the liquid pushed out of the liquid cylinder, and to refine the foam. A density of the foam dispensed from the discharging outlet falls within a range of 0.03 $g/cm^3$ to 0.06 $g/cm^3$.

4 Claims, 6 Drawing Sheets

(56) References Cited

U.S. PATENT DOCUMENTS

| | | | | |
|---|---|---|---|---|
| 2020/0331015 | A1* | 10/2020 | Lee | A47K 5/14 |
| 2020/0384488 | A1* | 12/2020 | Knight | B05B 11/0044 |
| 2021/0001358 | A1* | 1/2021 | Aoyama | B05B 7/0031 |

FOREIGN PATENT DOCUMENTS

| | | | |
|---|---|---|---|
| JP | 08-183729 | A | 7/1996 |
| JP | 8-225441 | A | 9/1996 |
| JP | 2550699 | Y2 | 10/1997 |
| JP | 2012-197081 | A | 10/2012 |
| JP | 2014-196116 | A | 10/2014 |
| JP | 2015-143128 | A | 8/2015 |
| WO | WO 2017/139727 | A1 | 8/2017 |

OTHER PUBLICATIONS

Extended European Search Report client received on Jan. 29, 2024, in corresponding European Patent Application No. 20 90 5206, 2 pages.

* cited by examiner

FIG. 5

| | COMPARATIVE EXAMPLE 1 | EXAMPLE 1 | EXAMPLE 2 | EXAMPLE 3 | COMPARATIVE EXAMPLE 2 | COMPARATIVE EXAMPLE 3 |
|---|---|---|---|---|---|---|
| DIAMETER OF AIR CYLINDER (mm) | 29.5 | 29.5 | 29.5 | 29.5 | 29.5 | 29.5 |
| DIAMETER OF LIQUID CYLINDER (mm) | 8.4 | 7.4 | 6.1 | 5.4 | 4.6 | 4.2 |
| RATIO BETWEEN DIAMETERS OF CYLINDERS | 3.5 : 1 | 4.0 : 1 | 4.8 : 1 | 5.5 : 1 | 6.4 : 1 | 7.0 : 1 |
| EXPANSION RATIO | 12 | 16 | 23 | 30 | 41 | 50 |
| DENSITY (g/cm3) | 0.08 | 0.06 | 0.04 | 0.03 | 0.02 | 0.02 |
| ELASTICITY (min sec) | 9 min 19 sec | 11 min 20 sec | 14 min 20 sec | 14 min 15 sec | 12 min 20 sec | 9 min 50 sec |
| STABILITY (LENGTH OF STREAMING FORM cm) | 10 | 3.0 | 1.5 | 1.5 | 0.5 | 0.5 |
| EVALUATION | × | ○ | ○ | ○ | × | × |

FOAM DISPENSING CONTAINER

TECHNICAL FIELD

This invention relates to a foam dispensing container that dispenses a foam of liquid produced by mixing the liquid being pushed out with air.

BACKGROUND ART

In order to reduce skin irritation and to improve detergency of cleanser such as facial foaming cleanser, the liquid soap is applied to a skin surface in the form of foam. Since this kind of cleanser contains surfactant, the cleanser is lathered by rubbing the cleanser on a hand or towel, and it is possible to produce a fine lather by rubbing the cleanser using a dedicated net or sponge.

However, since the above-mentioned tools such as the net and the sponge are required, it is not convenient to form a foam of cleanser in the liquid phase. In addition, since it is necessary to rub the cleanser on a hand, the cleanser may not be formed into a foam promptly. For example, Japanese Patent Laid-Open No. H8-183729 discloses a skin cleansing article possible to solve the above-explained disadvantages. According to the teachings of Japanese Patent Laid-Open No. H8-183729, a cleanser composition held in a container is dispensed from the container in the form of foam. Specifically, liquid and air in the container are delivered to a mixing section by squeezing the container to raise an internal pressure. The liquid and the air are mixed with each other in the mixing section to form a foam, and the foam is dispensed from a nozzle through a porous membrane formed in the mixing section. In general, density of the foam about 0.03 to 0.25 g/ml is desirable to remove dirt and for use in massage. In addition, according to the teachings of Japanese Patent Laid-Open No. H8-183729, a net of 50 to 500 mesh, preferably 150 to 400 mesh is adopted as the porous membrane.

SUMMARY OF INVENTION

Technical Problem to be Solved by the Invention

The invention disclosed in Japanese Patent Laid-Open No. H8-183729 specifies the cleanser composition contained in the container. Accordingly, Japanese Patent Laid-Open No. H8-183729 discloses evaluation results of detergency and homogeneity of foams with different components. In general, the cleanser components such as a facial wash and a liquid soap are contained in this kind of containers. Therefore, as described in Japanese Patent Laid-Open No. H8-183729, the detergency and homogeneity of the foam is required. In addition, tactile impression of the foam varies depending on elasticity of the foam, and stability of the foam is required to maintain the homogeneity of the foam. Further, in order to ensure a freshness and a premium feel, an appearance of the foam has to be different from an appearance of e.g., a foam produced by agitating contaminated water. In other words, a merchantability of the foam dispensing container is also governed by a quality of the foam including an appearance of the foam. However, although the detergency and the homogeneity of the foam may be ensured by the teachings of Japanese Patent Laid-Open No. H8-183729, Japanese Patent Laid-Open No. H8-183729 is silent about the above-mentioned factors affecting the merchantability of the foam dispensing container such as the elasticity, stability, appearance and so on of the foam. Hence, it is required to further improve the merchantability of the foam dispensing container.

The present invention has been conceived noting the above-explained technical problems, and it is therefore an object of the present invention to provide a foam dispensing container which can dispense a foam of good quality including a sustainability and an appearance.

Means for Solving the Problem

According to the present invention, there is provided a foam dispensing container, comprising: a cap that is mounted on an opening of a container containing a foamable liquid content; a nozzle member having a discharging outlet from which a foam is discharged, that is fitted onto the cap while being allowed to reciprocate in an axial direction; an air pump and a liquid pump reciprocated together with the nozzle member; an air cylinder that is joined to the air pump in a liquid-tight manner and that pushes air toward the discharging outlet in response to a reciprocation of the air pump; a liquid cylinder that is joined to the liquid pump in a liquid-tight manner and that pushes a liquid toward the discharging outlet in response to a reciprocation of the liquid pump; and a refining member that is arranged in the cap to form the foam by mixing the air pushed out of the air cylinder with the liquid pushed out of the liquid cylinder, and to refine the foam. In order to achieve the above explained objective, a density of the foam dispensed from the discharging outlet falls within a range of 0.03 g/cm$^3$ to 0.06 g/cm$^3$.

According to the present invention, a maximum diameter of bubble in the foam may be 450 μm or smaller, and an average diameter of the bubble in the foam may be 200 μm or smaller.

According to the present invention, an expansion ratio as a volume ratio between the air pushed out of the air cylinder by pushing down the nozzle member and the liquid pushed out of the liquid cylinder by pushing down the nozzle member may be 15.5 or greater but 30.5 or smaller.

According to the present invention, the air cylinder and the liquid cylinder may be individually shaped into a cylindrical member, and a ratio of a square of a diameter of the air cylinder to a square of a diameter of the liquid cylinder may be 15.5 or larger but 30.5 or smaller.

Advantageous Effects of Invention

According to the present invention, the density of foam dispensed from the discharging outlet is 0.06 g/cm$^3$ or smaller, therefore, elasticity and stability of the foam are excellent. For example, such foam expands between a skin to be washed and a palm of fingers while maintaining a desirable thickness for a sufficient period of time. Therefore, a cleansing feeling may be improved, and hence a user may be satisfied with the cleansing feeling. In addition, the foam may be maintained on the skin to be cleaned for a long period of time. Therefore, it is possible to remove the user's makeup effectively by the foam applied to the skin without scrubbing by hand. Further, since the foam is dispensed by pushing down the nozzle member, the foam may be formed easily when washing face without wasting the foamable liquid content. Thus, according to the present invention, quality of the foam to be dispensed may be improved, and hence a merchantability of the foam dispensing container may also be improved.

In addition, according to the present invention, the maximum diameter of bubble in the foam may be 450 μm or smaller, and the average diameter of the bubble in the foam may be 200 μm or smaller. Therefore, as described, the elasticity and stability of the foam may be improved, and in addition, large transparent bubbles are not contained in the foam. For this reason, a softness, a cleanness, and a premium feel of the foam can be improved. Consequently, the merchantability of the foam dispensing container may be improved.

According to the present invention, the expansion ratio as a volume ratio between the air and the liquid are adjusted between 16 and 30. Therefore, the softness, the cleanness, and the premium feel of the foam may be further improved thereby further enhancing the merchantability of the foam dispensing container.

BRIEF DESCRIPTION OF DRAWINGS

FIG. 5 is a table indicating densities, elasticities, stabilities (streaming length) and evaluations of foams according to examples 1 to 3 and comparative examples 1 to 3.

DESCRIPTION OF EMBODIMENT(S)

The foam dispensing container according to the present invention contains a foamable liquid. The liquid is mixed with air by pushing a nozzle member downwardly so that the liquid is dispensed from the nozzle member in the form of refined foam.

Figure 1:
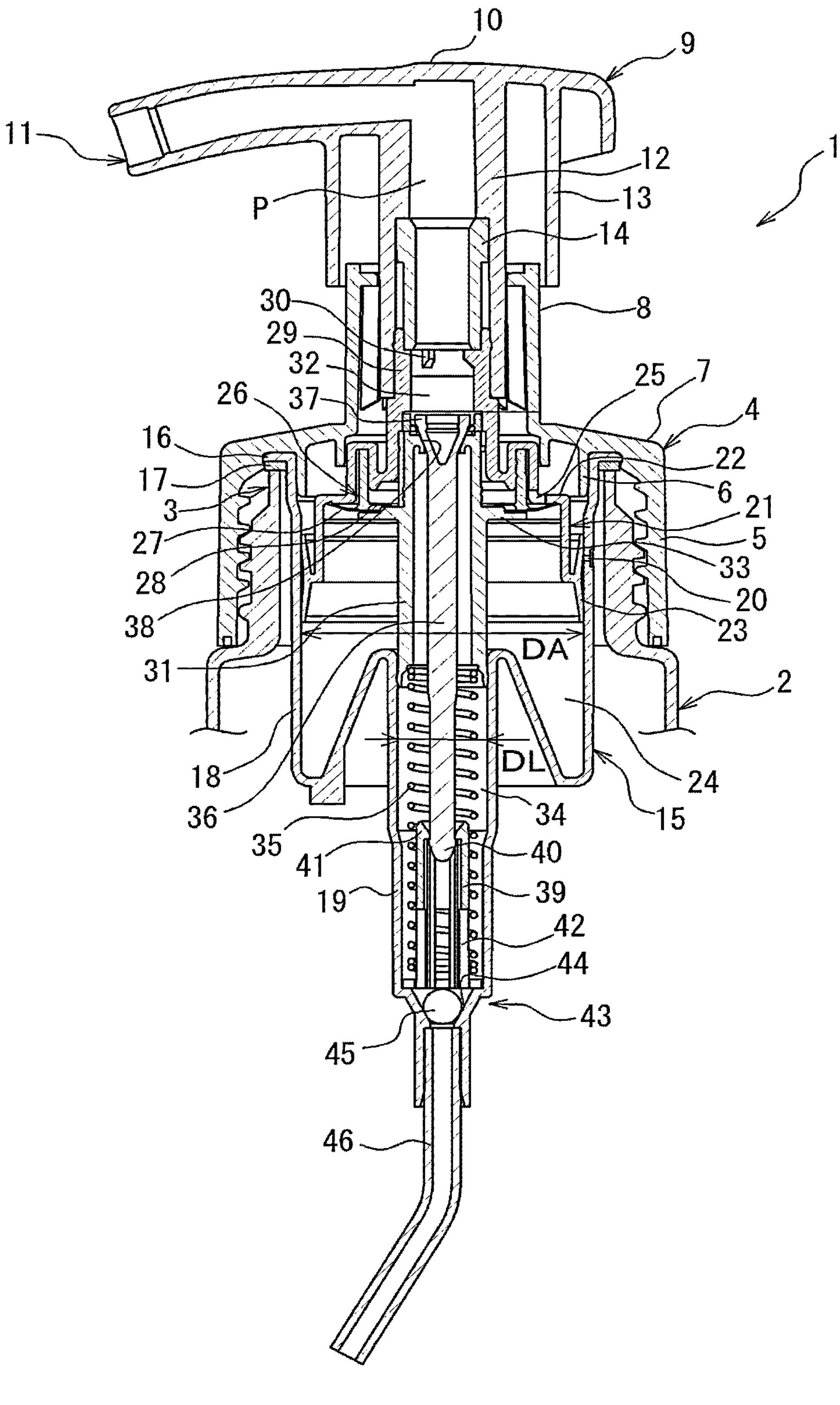
FIG. 1 is a cross-sectional view showing one example of a foam dispensing pump container according to the present invention.

Turning now to FIG. 1, there is shown a cross-section of a main part of the foam dispensing container according to the present invention. The foam dispensing container 1 shown in FIG. 1 is also called a pump foamer or a pump dispenser. The liquid held in a container 2 is mixed with the air to be dispensed in the form of foam. To this end, the foam dispensing container 1 shown in FIG. 1 is provided with a cap 4 that is mounted on a neck portion 3 of the container 2 in a detachable manner. Specifically, the neck portion 3 as a cylindrical portion is formed on an upper end of a trunk portion of the container 2, and a male thread is formed on an outer circumferential surface of the neck portion 3. Whereas, a female thread is formed on the cap 4 so that the cap 4 is screwed onto the neck portion 3.

As illustrated in FIG. 1, the cap 4 comprises an outer cylindrical section 5 that is diametrically larger than the neck portion 3, and an inner cylindrical section 6 as a boss that is formed concentrically within the outer cylindrical section 5. Specifically, an outer diameter of the inner cylindrical section 6 is smaller than an inner diameter of the neck portion 3, and an axial length of the inner cylindrical section 6 is shorter than the outer cylindrical section 5. An upper end of the outer cylindrical section 5 and an upper end of the inner cylindrical section 6 are joined to each other through a top panel 7 expanding in a radial direction. That is, the outer cylindrical section 5, the inner cylindrical section 6, and the top panel 7 are formed integrally with one another. The above-mentioned female thread is formed on an inner circumferential surface of the outer cylindrical section 5. The top panel 7 has a central opening that is diametrically smaller than the inner cylindrical section 6, and a cylindrical guide stem 8 is erected on an opening edge of the top panel 7. A nozzle member 9 is fitted onto the guide stem 8 while being allowed to reciprocate in an axial direction (i.e., upwardly and downwardly in FIG. 1) to serve as a pump of the foam dispensing container 1.

The nozzle member 9 comprises: a top board 10 as a nozzle head to which a pushing force is applied; a discharging outlet 11 from which the foam is discharged; an inner cylindrical section 12 in which a flow passage P communicated with the discharging outlet 11 is formed; and an outer cylindrical section 13 which is diametrically larger than the inner cylindrical section 12 and situated concentrically around the inner cylindrical section 12. Specifically, the nozzle member 9 is partially shaped into a cylindrical portion extending radially outwardly from an axial center of the nozzle member 9, and a leading end of the cylindrical portion serves as the discharging outlet 11. The inner cylindrical section 12 and the outer cylindrical section 13 extend downwardly in FIG. 1 from the top board 10, and the inner cylindrical section 12 is longer than the outer cylindrical section 13 in the axial direction. An outer diameter of the inner cylindrical section 12 is slightly smaller than an inner diameter of the guide stem 8 so that the inner cylindrical section 12 is inserted into the guide stem 8. An inner diameter of the outer cylindrical section 13 is slightly larger than an outer diameter of the guide stem 8 so that the guide stem 8 is inserted into the outer cylindrical section 13. Thus, the guide stem 8 is inserted into a clearance between the inner cylindrical section 12 and the outer cylindrical section 13 so that the inner cylindrical section 12 and the outer cylindrical section 13 is guided by the guide stem 8 when the nozzle member 9 is reciprocated. Slight clearances are maintained between an outer circumferential surface of the inner cylindrical section 12 and an inner circumferential surface of the guide stem 8, and between an outer circumferential surface of the guide stem 8 and an inner circumferential surface of the outer cylindrical section 13. Those clearances serve as air passages so that the air is introduced to an after-mentioned air cylinder through the air passages.

In the example shown in FIG. 1, in order to produce a homogenous foam, a net holder 14 is inserted into the inner cylindrical section 12. The net holder 14 is a cylindrical member, and a not shown porous sheet such as a net is attached to each axial end of the net holder 14. That is, the net holder 14 thus holding the porous sheet serves as a refining member of the embodiment of the present invention. Specifically, an inner diameter of the inner cylindrical section 12 is slightly increased in an opposite side of the top board 10 at a section lower than an intermediate portion, and the net holder 14 is fitted into the section of the inner cylindrical section 12 where the inner diameter is increased. As explained later, the foam produced by mixing the liquid and the air is let through the net holder 14 to be refined and homogenized.

A cylinder 15 is arranged inside of the cap 4. As illustrated in FIG. 1, the cylinder 15 is fitted onto the inner cylindrical section 6 of the cap 4, and an inner diameter of the cylinder 15 lower than the inner cylindrical section 6 is slightly reduced. A flange 16 expands from an upper end of the cylinder 15, and an outer diameter of the flange 16 is equal to or slightly larger than an outer diameter of a leading end (i.e., an opening end) of the neck portion 3. In order to ensure air tightness and liquid tightness, a sealing member 17 is interposed between the leading end (i.e., the opening end) of the neck portion 3 and a lower surface (in FIG. 1) of the flange 16. Specifically, the flange 16 and the sealing member 17 are clamped between the top panel 7 of the cap 4 and the leading end of the neck portion 3 by screwing the cap 4 onto the neck portion 3, and consequently the neck portion 3 is sealed liquid-tightly.

Here will be explained a structure of the cylinder 15 in more detail. The cylinder 15 comprises: an air cylinder 18 of an air pump that pumps air to the nozzle member 9; and a liquid cylinder 19 of a liquid pump that pumps the content (i.e., the foamable liquid) to the nozzle member 9. Specifically, the air cylinder 18 as a diametrically larger cylinder is formed below the portion fitted onto the inner cylindrical section 6 in the axial direction, and in order to introduce air to the container 2, a first suction inlet 20 as a through hole is formed on the air cylinder 18 in the vicinity of an upper end of the air cylinder 18. Whereas, the liquid cylinder 19 is diametrically smaller than the air cylinder 18, and is formed concentrically with the air cylinder 18. Specifically, as illustrated in FIG. 1, the liquid cylinder 19 is partially situated radially inner side of the air cylinder 18. That is, the liquid cylinder 19 is formed concentrically with the air cylinder 18, and the liquid cylinder 19 overlaps with the air cylinder 18 at least partially in the radial direction. In this example, the liquid cylinder 19 is formed integrally with the air cylinder 18. As illustrated in FIG. 1, a boundary between the air cylinder 18 and the liquid cylinder 19 is curved to protrude upwardly in FIG. 1 so that a flange of an after-mentioned liquid piston comes into contact to the boundary when the liquid piston is pushed down. In other words, the piston is stopped by the boundary when the nozzle member 9 is pushed down. That is, the protrusion between the air cylinder 18 and the liquid cylinder 19 is a stroke end as a lower limit position of the piston pushed into the container 2. In the example shown in FIG. 1, the nozzle member 9 is positioned at an upper limit position.

An air piston 21 is fitted into the air cylinder 18 while being contacted air-tightly to an inner circumferential surface of the air cylinder 18, and being allowed to reciprocate in the axial direction (i.e, the vertical direction in FIG. 1). That is, the air cylinder 18 and the air piston 21 serve as the above-mentioned air pump. The air piston 21 comprises: a piston head 22 that divides an internal space of the air cylinder 18 into an upper space and a lower space; and a contact portion 23 that is formed integrally with the piston head 22 to be contacted to the inner circumferential surface of the air cylinder 18. In the example shown in FIG. 1, the internal space of the air cylinder 18 below the piston head 22 serves as an air chamber 24. Specifically, the contact portion 23 is a cylindrical portion, and an upper cylindrical section and a lower cylindrical section of the contact portion 23 are contacted air-tightly to the inner circumferential surface of the air cylinder 18 in a slidable manner. Thus, the above-mentioned first suction inlet 20 is opened and closed by reciprocating the contact portion 23 in the axial direction.

In order to introduce air to the air chamber 24, a second suction inlet 25 as a through hole is formed on a predetermined portion of the piston head 22. Further, in order to selectively connect the air chamber 24 to the external space of the container 2 and an after-mentioned mixing chamber depending on an internal pressure of the air chamber 24, a valve element 26 is attached to the piston head 22 at a radially inner side of the second suction inlet 25.

The valve element 26 comprises: a cylindrical stem that is fitted into a recess formed on the piston head 22; an annular outward valve portion expanding radially outwardly from an end portion of the cylindrical stem protruding from the recess; and an annular inward valve portion expanding radially inwardly from the end portion of the cylindrical stem protruding from the recess. Specifically, the annular outward valve portion covers the second suction inlet 25 in the air chamber 24 from an inner side. That is, when an internal pressure of the air chamber 24 is higher than an external pressure outside of the container 2, the second suction inlet 25 is closed by the annular outward valve portion. By contrast, the second suction inlet 25 is opened when the internal pressure of the air chamber 24 is lower than the external pressure outside of the container 2. Thus, the annular outward valve portion of the valve element 26 serves as an air-suction valve 27 to selectively allow and inhibit the external air to enter the air chamber 24. On the other hand, the annular inward valve portion is contacted to the flange of the after-mentioned liquid piston. That is, when the internal pressure of the air chamber 24 is higher than the external pressure outside of the container 2, the air chamber is connected to the mixing chamber by the annular inward valve. By contrast, the air chamber 24 is disconnected from the mixing chamber when the internal pressure of the air chamber 24 is lower than the external pressure outside of the container 2. Thus, the annular inward valve portion of the valve element 26 serves as an air-discharging valve 28 to selectively supply the air in the air chamber 24 to the mixing chamber or push out the air from the mixing chamber.

A cylindrical section 29 extends (upwardly in FIG. 1) from a radially central portion of the piston head 22 in an opposite direction to the container 2. The inner cylindrical section 12 of the nozzle member 9 is fitted onto one end (i.e., an upper end in FIG. 1) of the cylindrical section 29, and a lower end of the net holder 14 is fitted into said one end of the cylindrical section 29. In the example shown in FIG. 1, a ridge is formed on an outer circumferential surface of said one end of the cylindrical section 29, and a groove formed on an inner circumferential surface of the inner cylindrical section 12 is engaged with the ridge of the cylindrical section 29. Thus, the cylindrical section 29 is firmly joined to the inner cylindrical section 12 by engaging the ridge with the groove. Instead, the cylindrical section 29 may also be joined to the inner cylindrical section 12 by a screw, a tightening method, a transition fit or the like.

An inner diameter of said one end of the cylindrical section 29 is slightly larger than an outer diameter of the lower end of the net holder 14, and a plurality of projections 30 are formed on a lower section of an inner circumferential surface of said one end of the cylindrical section 29. Each of the projections 30 protrudes radially inwardly so that the net holder 14 is positioned in the flow passage P. When the nozzle member 9 is pushed down, the projections 30 come into contact to one end of an after-mentioned shaft member so that the shaft member is pushed by the projections 30. In order not to hinder flowage of the content in the flow passage P, a distance between the projections 30 opposed to each other is set substantially identical to an inner diameter of the net holder 14. Specifically, as illustrated in FIG. 1, the lower end of the net holder 14 is fitted into a joint space formed between the projection 30 and said one end of the cylindrical section 29 where the inner diameter is larger. Thus, the air piston 21 is integrated with the nozzle member 9, and the net holder 14 is held in the flow passage P formed in the air piston 21 and the nozzle member 9. When the top board 10 of the nozzle member 9 is pushed down toward the container 2, the air piston 21 is pushed down by the nozzle member 9 toward the container 2 so that a substantial inner volume of the air chamber 24 formed in the air cylinder 18 and the air piston 21 is reduced. Consequently, the air chamber 24 is pressurized so that the air in the air chamber 24 is pushed out of the air chamber 24. In this situation, the projections 30 come into contact to an upper end of a valve element of the after-mentioned shaft member so that the shaft member is pushed toward the container 2.

A liquid piston 31 of the liquid pump is engaged with the other end (i.e., a lower end in FIG. 1) of the cylindrical section 29. As illustrated in FIG. 1, the liquid piston 31 is a cylindrical member extending in the axial direction, and one end of the liquid piston 31 (i.e., an upper end in FIG. 1) is engaged with the other end of the cylindrical section 29. Specifically, the other end of the cylindrical section 29 is depressed in the axial direction to expand an inner diameter, and said one end of the liquid piston 31 is fitted into the depression of the cylindrical section 29. Although not especially shown in FIG. 1, an air passage is formed between the depression and said one end of the liquid piston 31. A space maintained in the axial direction between: a joint site between the other end of the cylindrical section 29 and the liquid piston 31; and the net holder 14 fitted into the cylindrical section 29, serves as a mixing chamber 32 in which the liquid content is mixed with the air. One end of the above-mentioned air passage is connected to the flow passage P passing through the cylindrical section 29, and the other end of the above-mentioned air passage is connected to a space between the liquid piston 31 and the air piston 21.

As described, in order to define the lower limit positions of the air piston 21 and the liquid piston 31, a flange 33 expanding radially outwardly is formed on an outer circumferential surface of the liquid piston 31. For example, when the nozzle member 9 is positioned at an upper limit position as illustrated in FIG. 1, the air-discharging valve 28 is contacted to an upper surface of the flange 33. The other end of the liquid piston 31 is fitted into the liquid cylinder 19 liquid-tightly while being allowed to reciprocate in the axial direction (i.e., in the vertical direction in FIG. 1). Thus, the liquid cylinder 19 and the liquid piston 31 serve as the above-mentioned liquid pump, and a cylindrical space in the liquid cylinder 19 and the liquid piston 31 serves as a liquid chamber 34. As described, when the top board 10 of the nozzle member 9 is pushed down toward the container 2, the liquid piston 31 is pushed down toward the container 2 together with the air piston 21 so that a substantial inner volume of the liquid chamber 34 is reduced. Consequently, the liquid chamber 34 is pressurized so that the liquid in the liquid chamber 34 is pushed out of the liquid chamber 34.

The air chamber 24 and the liquid chamber 34 are configured such that a volume ratio between the air pushed out of the air chamber 24 and the foamable liquid (i.e., the content) falls within the range of 16 to 30. Therefore, an expansion ratio of the foam to be dispensed falls within the range of 16 to 30, and a foam density falls within the range of 0.03 g/cm$^3$ to 0.06 g/cm$^3$. Specifically, the expansion ratio of the foam to be dispensed may be expressed as:

$$16 \le DA^2/DL^2 \le 30;$$

where DA is an inner diameter of the air cylinder 18, and DL is an inner diameter of the liquid cylinder 19. In the above expression, specifically, DA is an average inner diameter of the air cylinder 18 within a sliding range of the air piston 21, and DL is an average inner diameter of the liquid cylinder 19 within a sliding range of the liquid piston 31. It is to be noted that the lower limit value "16" and the upper limit value "30" are rounded to be integers taking account of measurement errors. That is, the lower limit value includes 16 having a decimal value, and the upper limit value includes 30 having a decimal value.

When the pushing force pushing the nozzle member 9 and the pistons toward the container 2 is cancelled, the nozzle member 9 and the pistons are returned to the initial positions by a returning mechanism arranged in the liquid chamber 34. The liquid chamber 34 is connected to an internal space of the container 2 and to the mixing chamber 32 and the flow passage P by a valve mechanism also arranged in the liquid chamber 34, in response to the reciprocation of the nozzle member 9. According to the exemplary embodiment, a coil spring (hereinafter simply referred to as spring) 35 serves as the returning mechanism to return the nozzle member 9 and the pistons 21 and 31 to the initial positions. Specifically, the spring 35 is arranged between a receiving section formed on the other end of the liquid piston 31 and a receiving section formed on an inner circumference of a bottom of the liquid cylinder 19 while being compressed. That is, the liquid piston 31 is always pushed toward an opposite side to the container 2 (i.e., upwardly in FIG. 1) by an elastic force of the spring 35.

The valve mechanism comprises a shaft member 36 arranged along a center axis of the liquid cylinder 19. One end (i.e., an upper end in FIG. 1) of the shaft member 36 protrudes from said one end of the liquid piston 31, and a valve element 37 is formed on said one end of the shaft member 36. Specifically, the valve element 37 is a tapered section in which an outer diameter of the valve element 37 increases gradually toward said one end of the shaft member 36. On the other hand, an annular protrusion protruding radially inwardly toward a center of the flow passage P is formed on said one end of the liquid piston 31. Specifically, the annular protrusion is situated closer to the container 2 than the valve element 37, and a minimum inner diameter of the annular protrusion is smaller than an outer diameter of the valve element 37 so that the annular protrusion is engaged with a tapered surface of the valve element 37. In addition, an upper surface (facing to the tapered surface of the valve element 37) of the annular protrusion is also tapered such that the inner diameter increases gradually toward the upper end. Therefore, the annular protrusion is allowed to contact to the valve element 37 from below to close the flow passage P and the liquid chamber 34 in a liquid-tight manner. Thus, the annular protrusion serves as a valve seat 38.

In the example shown in FIG. 1, the other end (i.e., a lower end in FIG. 1) of the shaft member 36 opposite to the valve element 37 is shaped into an arrowhead shape pointing downwardly having a triangular cross-section. The other end of the shaft member 36 is inserted into a cylindrical retaining member 39 arranged in a bottom of the liquid cylinder 19 in such a manner as to slide on an inner circumferential surface of the retaining member 39. Specifically, an outer diameter of the lower end of the shaft member 36 is slightly larger than an inner diameter of the retaining member 39, and the lower end of the shaft member 36 is pushed into the retaining member 39 while being shrunk elastically. That is, an outer circumferential surface of the lower end of the shaft member 36 is elastically pushed onto the inner circumferential surface of the retaining member 39. Therefore, when the shaft member 36 is not pushed downwardly by a load applied thereto, an axial movement of the shaft member 36 is prevented by an elastic force of the lower end of the shaft member 36 and a frictional force acting between the outer circumferential surface of the lower end of the shaft member 36 and the inner circumferential surface of the retaining member 39. Thus, the lower end of the shaft member 36 serves as a plug 40 inserted into the retaining member 39.

An inner circumferential portion of one end (i.e., an upper end in FIG. 1) of the retaining member 39 is also shaped into an arrowhead shape having a triangular cross-section to serve as a hook 41 engaged with an expanded base portion of the plug 40 of the shaft member 36. Therefore, the shaft member 36 is retained within the retaining member 39 by the hook 41, and the nozzle member 9 and the pistons 21 and 31 is prevented from being pulled upwardly further than the upper limit positions. Those upper limit positions are initial positions or stroke ends of the nozzle member 9 and the pistons 21 and 31. A plurality of grooves 42 as flow passages of the liquid content are formed on a lower surface of the retaining member 39 in such a manner as to extend in the axial direction at regular intervals in a circumferential direction. As explained below, since an internal space of the retaining member 39 is connected to the internal space, the liquid content is allowed to flow into the liquid chamber 34 through the grooves 42 from the internal space of the retaining member 39.

A check valve is arranged in the bottom of the liquid cylinder 19. The check valve is opened to take up the liquid content from the internal space of the container 2 to the liquid chamber 34, and closed to push out the liquid content from the liquid chamber 34. In the exemplary embodiment, a ball valve 43 is adopted as the check valve, and a valve seat 44 is formed in the bottom of the liquid cylinder 19. Specifically, the valve seat 44 has a tapered shape in which an inner diameter thereof increases gradually upwardly, and a ball 45 comes into contact to a tapered surface of the valve seat 44 from above. In order to introduce the liquid content held in the container 2 to the liquid chamber 34, the bottom of the liquid cylinder 19 is joined to a tube 46 extending to the vicinity of a not shown bottom of the container 2.

Next, here will be explained an action of the foam dispensing container 1 according to the present invention. As illustrated in FIG. 1, when the nozzle member 9 is not pushed down, the nozzle member 9 is positioned at the upper limit position. In the situation shown in FIG. 1, the pistons 21 and 31 are pushed upwardly in the cylinders 18 and 19 (i.e., in FIG. 1) by the elastic force of the spring 35. Consequently, the valve seat 38 formed on said one end of the liquid piston 31 is pushed onto the valve element 37 of the shaft member 36 thereby disconnecting the liquid chamber 34 from the mixing chamber 32 and the flow passage P. In this situation, the plug 40 of the shaft member 36 is retained within the retaining member 39 by the hook 41, and the ball 45 of the ball valve 43 is contacted to the valve seat 44 under its own weight and by a weight of the liquid content in the liquid chamber 34 so that the liquid chamber 34 is also disconnected from the internal space of the container 2. In addition, the first suction inlet 20 formed on the air cylinder 18 is closed by the contact portion 23 of the air piston 21. In this situation, since the air piston 21 is not reciprocated in the axial direction, the inner volume of the air chamber 24 is not changed. Therefore, the second suction inlet 25 is covered by the air-suction valve 27, and the air-discharging valve 28 is contacted to the flange 33 of the liquid piston 31. That is, both of the air-suction valve 27 and the air-discharging valve 28 are closed.

Figure 2:
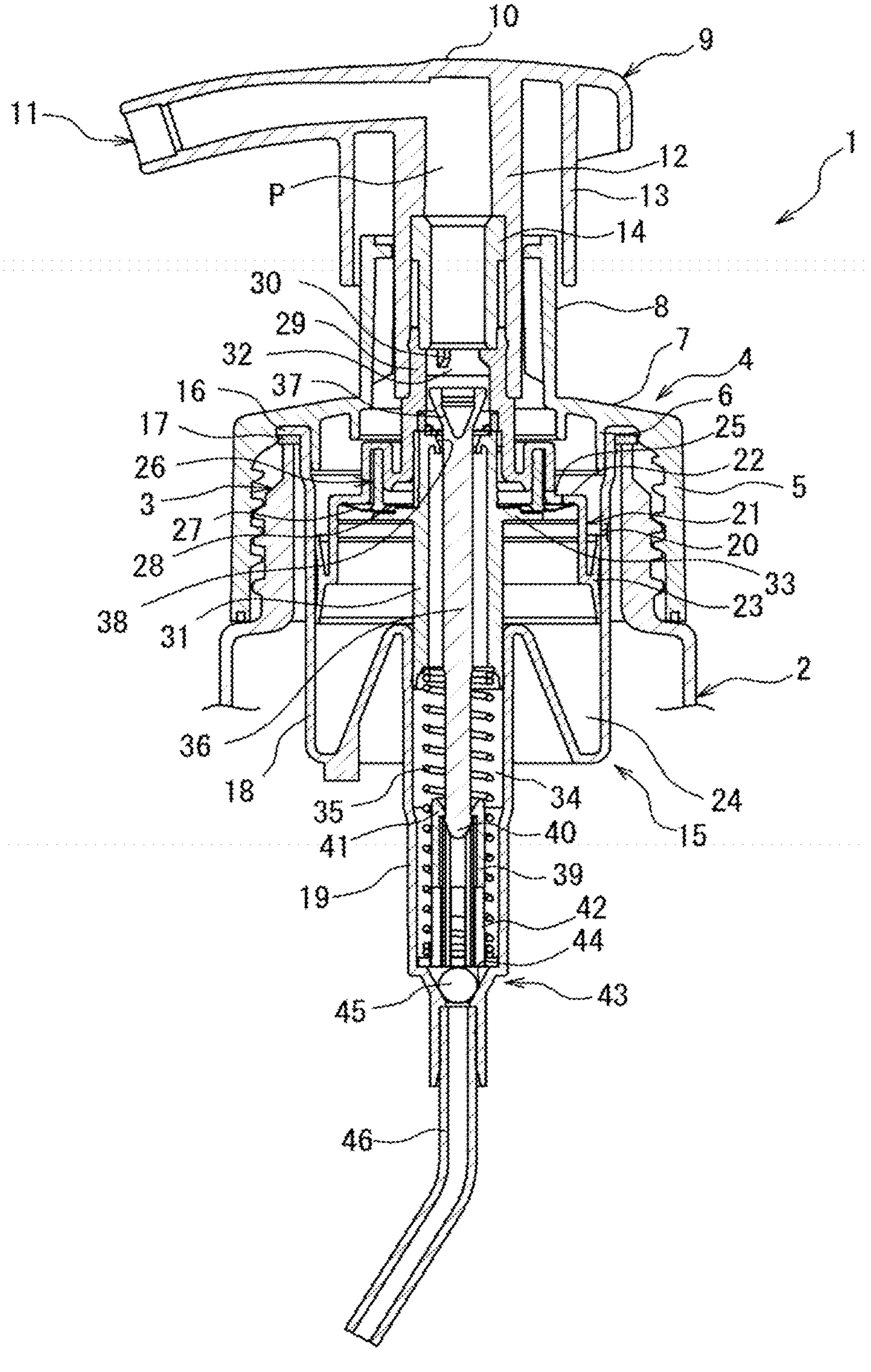
FIG. 2 is a cross-sectional view showing a cross-section of the foam dispensing pump container in which a nozzle member is slightly pushed down from an upper limit position.

Turning to FIG. 2, there is shown a situation in which the nozzle member 9 is slightly pushed down toward the container 2. When the nozzle member 9 is slightly pushed down from the upper limit position, the pistons 21 and 31 are also pushed down by the pushing force applied to the nozzle member 9. In this situation, as illustrated in FIG. 2, the plug 40 of the shaft member 36 is elastically and frictionally pushed onto the inner circumferential surface of the retaining member 39. In addition, in this situation, a force other than the frictional force and the elastic force is not applied to the shaft member 36. In the situation shown in FIG. 2, therefore, the shaft member 36 is fixed by the retaining member 39 with respect to the cylinders 18 and 19. In this situation, however, the shaft member 36 is allowed to move relatively to the liquid piston 31. Specifically, the shaft member 36 is allowed to move relatively to the liquid piston 31 until the projections 30 formed on the inner circumferential surface of the cylindrical section 29 come into contact to the valve element 37 of the shaft member 36 to push the liquid piston 31 toward the container 2, by further pushing the air piston 21 downwardly.

Figure 3:
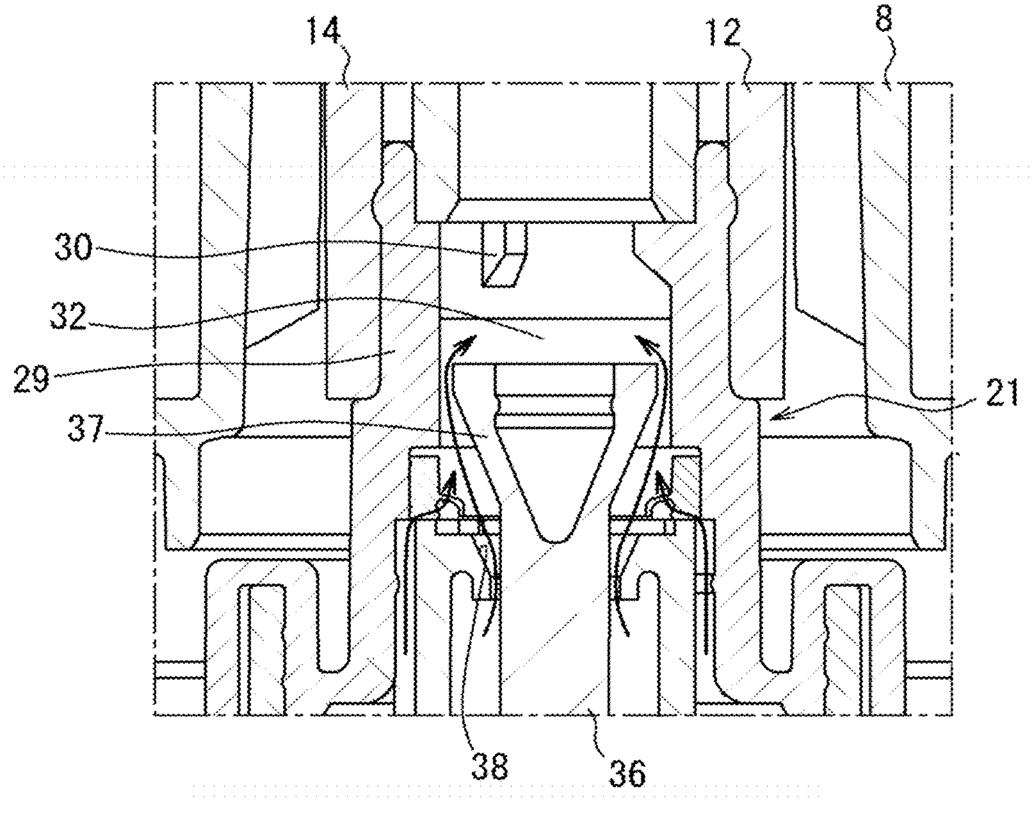
FIG. 3 is a partial enlarged view showing an enlarged cross-section of the foam dispensing pump container in which the nozzle member is slightly pushed down from the upper limit position.

A situation of the foam dispensing container 1 when the nozzle member 9 is slightly pushed down is shown in FIG. 3 in an enlarged scale. As illustrated in FIG. 3, when the liquid piston 31 is pushed down, the valve seat 38 of the liquid piston 31 is isolated from the valve element 37 of the shaft member 36 so that the liquid chamber 34 and the mixing chamber are communicated with each other through a clearance created between the shaft member 36 and the valve seat 38. In this situation, the spring 35 is compressed by the liquid piston 31 being pushed downwardly and an inner volume of the liquid chamber 34 is reduced. Consequently, an internal pressure of the liquid chamber 34 is raised and the ball 45 of the ball valve 43 is contacted strongly to the valve seat 44. In this situation, therefore, the liquid chamber 34 is still disconnected from the internal space of the container 2, and the liquid content held in the liquid chamber 34 is pushed out to the mixing chamber 32 through the clearance between the shaft member 36 and the valve seat 38.

When the air piston 21 is pushed down toward the container 2, the contact portion 23 is moved below the first suction inlet 20 so that a space above the piston head 22 is connected to the external space of the container 2 through the first suction inlet 20. In this situation, as a result of pushing down the pistons 21 and 31, the inner volume of the air chamber 24 is reduced. Consequently, the internal pressure of the air chamber 24 is raised so that the air-suction valve 27 is pushed onto the second suction inlet 25. Whereas, the air-discharging valve 28 is isolated from the flange 33 of the liquid piston 31. As a result, the air in the air chamber 24 flows out of the air-discharging valve 28, and pushed into the mixing chamber 32 through the air passage formed in the joint site between the cylindrical section 29 and the liquid piston 31.

The clearance between the shaft member 36 and the valve seat 38 is narrow, and the clearance between the cylindrical section 29 and the valve element 37 is also narrow. Therefore, the liquid content in the liquid chamber 34 is delivered to the mixing chamber 32 at a high speed, and the air pushed out of the air chamber 24 is delivered to the mixing chamber 32 also at a high speed. For these reasons, the air and the liquid content are mixed with each other while being agitated to form a foam.

When the nozzle member 9 is further pushed downwardly from the position shown in FIG. 2 or 3, the projections 30 come into contact to the valve element 37 of the shaft member 36. In this situation, by further pushing down the nozzle member 9, the shaft member 36 is pushed down toward the container 2 by the pistons 21 and 31. That is, the shaft member 36 is moved integrally with the pistons 21 and 31. In this situation, the shaft member 36 is moved relatively with respect to the cylinders 18 and 19, and the plug 40 of the shaft member 36 being contacted to the inner circumferential surface of the retaining member 39 is moved toward the container 2. Consequently, the inner volume of the air chamber 24 is further reduced so that the air in the air chamber 24 is pushed into the mixing chamber 32. Likewise, the liquid content in the liquid chamber 34 is pushed into the mixing chamber 32. As described, the air and the liquid content are mixed together to form a foam in the mixing chamber 32, and the foam is pushed out of the mixing chamber 32 toward the net holder 14 by the air pushed out of the air chamber 24 and the liquid content pushed out of the liquid chamber 34. The foam is finely smoothened and homogenized as a result of passing through the net holder 14, and flows through the flow passage P to be dispensed from the discharging outlet 11.

Figure 4:
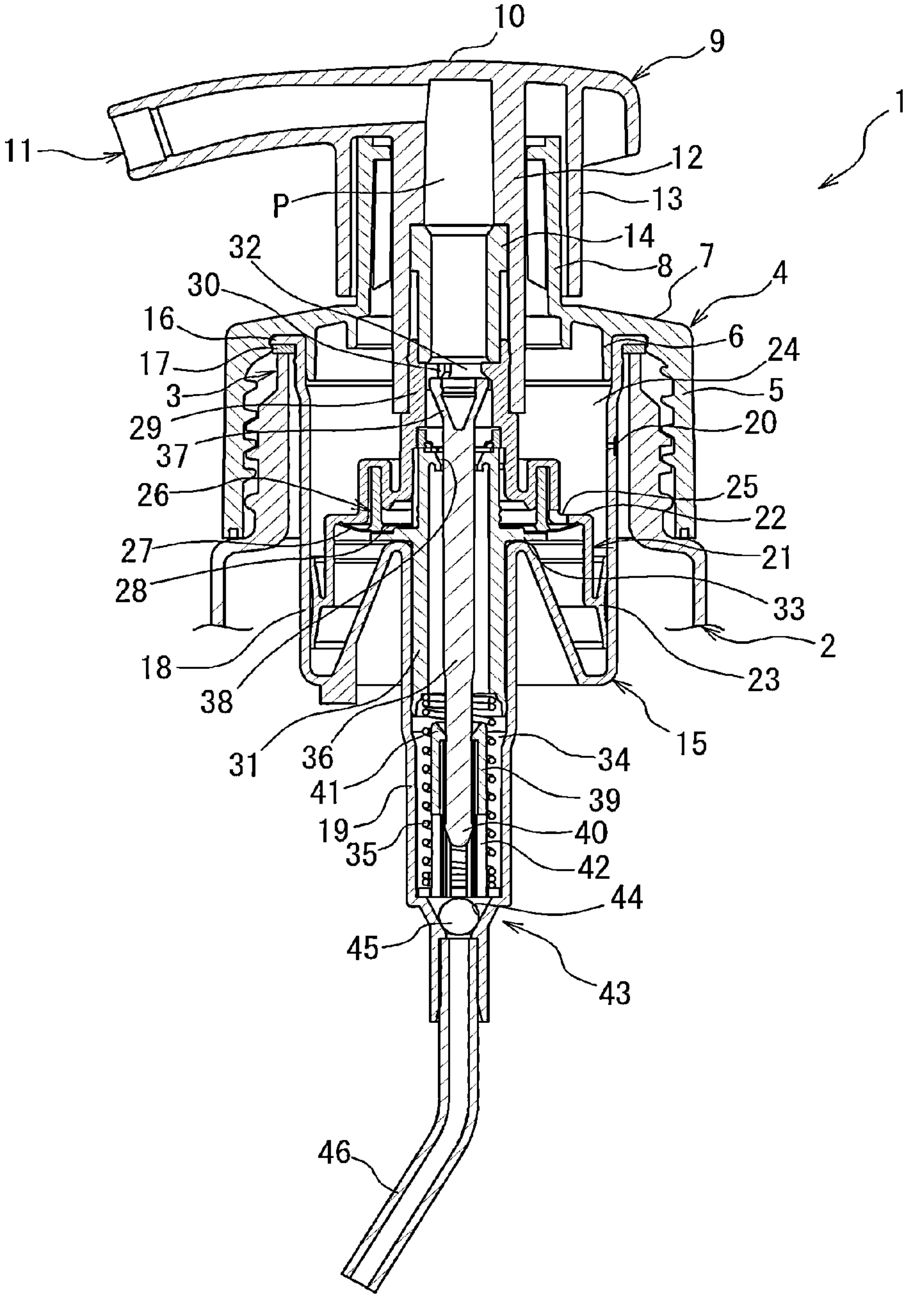
FIG. 4 is a cross-sectional view showing a cross-section of the foam dispensing pump container in which the nozzle member is pushed down to a lower limit position.

Thus, the pistons 21 and 31 are moved toward the container 2, and as illustrated in FIG. 4, the flange 33 of the liquid piston 31 eventually comes into contact to the boundary between the air cylinder 18 and the liquid cylinder 19. Consequently, the nozzle member 9 and the pistons 21 and 31 moving downwardly (i.e., being pushed downwardly) are stopped. That is, in the situation illustrated in FIG. 4, the nozzle member 9 and the pistons 21 and 31 are stopped at a lower limit position as a stroke end. The internal pressures of the air chamber 24 and the liquid chamber 34 are reduced after discharging the contents, and when the internal pressures of the air chamber 24 and the liquid chamber 34 are balanced with an external pressure, the contents are no longer discharged.

According the exemplary embodiment of the present invention, the foam dispensing container 1 is configured to dispense the foam whose density falls within the range of 0.03 g/cm$^3$ to 0.06 g/cm$^3$. A reason to adjust the density of the foam within the above-mentioned range will be explained hereinafter.

In order to carry out experiments (examples 1 to 3 and comparative examples 1 to 3), a plurality of foam dispensing containers were prepared, and those foam dispensing containers were configured to dispense foams at different expansion ratios. In the experiments, a commercially available facial wash (called "Biore Marshmallow Whip™" manufactured by Kao Corporation [viscosity: 12 mPa·s]) was used as a sample to dispense a foam. Basic structures of the prepared foam dispensing containers were similar to that of the foregoing structure, but inner diameters of the air cylinder and the liquid cylinders of those foam dispensing containers were changed to vary the expansion ratio of the foam to be dispensed. In each of the foam dispensing containers, a porous member of 100 mesh is attached to a mixing chamber side of the net holder, and a porous member of 200 mesh is attached to a discharging outlet side of the net holder.

Densities (g/cm$^3$), elasticities, stabilities, and appearances of foams dispensed from the foam dispensing containers were measured and evaluated. Specifically, the density of foam sample was obtained by measuring a weight of a dedicated measurement container having a predetermined inner volume that is filled with the foam. The elasticity of the foam sample was obtained by measuring an amount of time until a metallic disc put on a surface of the foam held in the measurement container sank to a bottom of the measurement container. Note that a depth of the measurement container was 5 cm. The stability of the foam sample was measured by measuring a length of the foam streaming down a BIO skin plate as an imitation of a human skin erected vertically in 5 minutes. The appearance of the foam sample was visually evaluated.

Example 1

Figure 6:
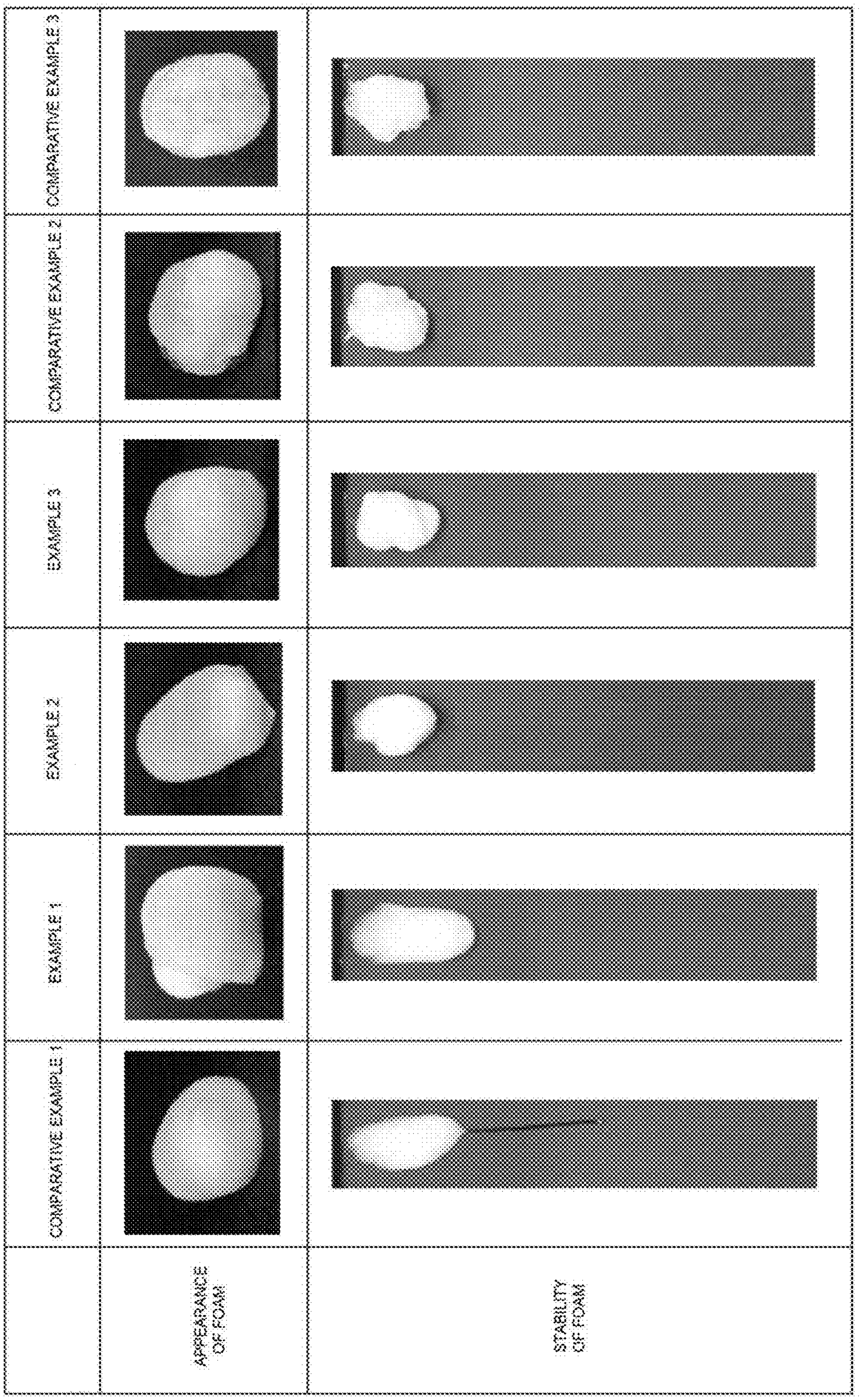
FIG. 6 shows pictures of appearances and stabilities of the foams according to examples 1 to 3 and comparative examples 1 to 3 instead of drawings.

A diameter of the air cylinder (i.e., a diameter of an inner circumferential surface, same applies hereafter) was set to 29.5 mm, and a diameter of the liquid cylinder was set to 7.4 mm. Accordingly, a ratio between the diameters of the cylinders was "3.99:1" (approximately 4:1), and an expansion ratio was "15.89" (approximately 16). A density of the dispensed foam was 0.06 g/cm$^3$, and a length of time as a parameter of the elasticity until the metallic disc whose weight was 2 g sank to the bottom of the measurement container was 11 minutes and 20 seconds. A length of the foam streaming down the BIO skin plate erected vertically as a parameter of the stability was 3.0 cm. As to the appearance of the foam, there was no visually recognizable bubble, and looked entirely smooth. Therefore, an evaluation of the foam was good as indicated by "0" in the table shown in FIG. 5. Evaluation results of the example 2 and 3, and the comparative examples 1 to 3 are also shown in FIG. 5. Pictures of appearances and stabilities of the foams according to the examples 1 to 3 and the comparative examples 1 to 3 are shown in FIG. 6 in place of drawings.

Example 2

A diameter of the air cylinder was set to 29.5 mm, and a diameter of the liquid cylinder was set to 6.1 mm. Accordingly, a ratio between the diameters of the cylinders was "4.84:1" (approximately 4.8:1), and an expansion ratio was "23.39" (approximately 23). A density of the dispensed foam was 0.04 g/cm$^3$, and said length of time as a parameter of the elasticity was 14 minutes and 20 seconds. Said length of the foam as a parameter of the stability was 1.5 cm. That is, the stability of the foam was higher than the example 1. As to the appearance of the foam, there was no visually recognizable bubble, and looked entirely smooth. Therefore, an evaluation of the foam was also good as indicated by "0" in the table shown in FIG. 5. The appearance and the stability of the foam was depicted in FIG. 6.

As to sizes of bubbles, a maximum diameter was 372.6 μm, a minimum diameter was 40.7 μm, and an average diameter was 171.6 μm. Specifically, those diameters of the bubbles were measured by measuring diameter of visible bubbles on a surface of the foam using a microscope whose magnification ratio was 200. The average diameter of the bubbles was calculated as an average diameter of randomly chosen 10 bubbles. In the example 2, the maximum diameter and the average diameter of the bubbles were further reduced by arranging a finer net (of 305) in the discharging outlet in front of an opening end. However, although the minimum diameter of the bubble was slightly reduced, the minimum diameter of the bubble was not reduced significantly.

Example 3

A diameter of the air cylinder was set to 29.5 mm, and a diameter of the liquid cylinder was set to 5.4 mm. Accordingly, a ratio between the diameters of the cylinders was "5.46:1" (approximately 5.5:1), and an expansion ratio was "29.84" (approximately 30). A density of the dispensed foam was 0.03 g/cm$^3$, and said length of time as a parameter of the elasticity was 14 minutes and 15 seconds. Said length of the foam as a parameter of the stability was 1.5 cm. That is, the stability of the foam was higher than the example 1. As to the appearance of the foam, there was no visually recognizable bubble, and looked entirely smooth. Therefore, an evaluation of the foam was also good as indicated by "0" in the table shown in FIG. 5. The appearance and the stability of the foam was depicted in FIG. 6.

Comparative Example 1

A diameter of the air cylinder was set to 29.5 mm, and a diameter of the liquid cylinder was set to 8.4 mm. Accordingly, a ratio between the diameters of the cylinders was "3.51:1" (approximately 3.5:1), and an expansion ratio was "12.23" (approximately 12). A density of the dispensed foam was 0.08 g/cm$^3$, and said length of time as a parameter of the elasticity was 9 minutes and 19 seconds. Thus, the metallic disc sank promptly. That is, the foam was softer (i.e., less elasticity) than the foams according to the foregoing examples. Said length of the foam as a parameter of the stability was 10 cm. Specifically, as shown in FIG. 6, bubbles popped faster than the foams according to the foregoing examples and turned into a liquid phase to stream down. That is, the stability of the foam was lower than the foregoing examples. As to the appearance of the foam, there was no visually recognizable bubble, and looked entirely smooth. Therefore, an evaluation of the foam was no good as indicated by "X" in the table shown in FIG. 5.

Comparative Example 2

A diameter of the air cylinder was set to 29.5 mm, and a diameter of the liquid cylinder was set to 6.4 mm. Accordingly, a ratio between the diameters of the cylinders was "6.41:1" (approximately 6.4:1), and an expansion ratio was "41.13" (approximately 41). A density of the dispensed foam was 0.02 g/cm$^3$, and said length of time as a parameter of the elasticity was 12 minutes and 20 seconds. Thus, the elasticity of the foam was comparable to the foam according to the Example 1. Said length of the foam as a parameter of the stability was 0.5 cm. That is, as shown in FIG. 6, bubbles were firm enough to maintain its shapes. As to the appearance of the foam, there were some recognizably large transparent bubbles, and hence a contour of the foam was entirely uneven, that is, not smooth enough. In other words, the appearance of the foam was not creamy and soft enough. Therefore, an evaluation of the foam was no good as indicated by "X" in the table shown in FIG. 5.

Comparative Example 3

A diameter of the air cylinder was set to 29.5 mm, and a diameter of the liquid cylinder was set to 4.2 mm. Accordingly, a ratio between the diameters of the cylinders was "7.02:1" (approximately 7.0:1), and an expansion ratio was "49.33" (approximately 50). A density of the dispensed foam was 0.02 g/cm$^3$, and said length of time as a parameter of the elasticity was 9 minutes and 50 seconds. Thus, the elasticity of the foam was insufficient as the comparative example 1. That is, it was confirmed that the elasticity of the foam is reduced by increasing the expansion ratio. Said length of the foam as a parameter of the stability was 0.5 cm. That is, as shown in FIG. 6, bubbles were firm enough to maintain its shapes. As to the appearance of the foam, there were some recognizably large transparent bubbles, and hence a contour of the foam was entirely uneven, that is, not smooth enough. In other words, the appearance of the foam was not creamy and soft enough. Therefore, an evaluation of the foam was no good as indicated by "X" in the table shown in FIG. 5.

Based on the evaluations of the examples 1 to 3 and the comparative examples 1 to 3, according to the exemplary embodiment of the present invention, the foam dispensing container 1 is configured to dispense the foam whose density is 0.03 g/cm$^3$ or greater but 0.06 g/cm$^3$ or smaller. The foam dispensing container 1 is further configured to adjust the volume ratio between the foamable liquid content pushed out of the liquid chamber 34 and the air pushed out of the air chamber 24 is 15.5 or greater but 30.5 or smaller without uncertainty. Those numbers after the decimal points may be considered as measurement errors. Therefore, the above-mentioned volume ratio as the expansion ratio of the foam to be dispensed may be rounded to be integers. That is, the foam dispensing container 1 is further configured to adjust the expansion ratio of the foam to be dispensed between 16 to 30. Specifically, in the foam dispensing container in which the liquid piston and the air piston are reciprocated integrally, the volume ratio between the liquid content and the air pushed out of the chambers is governed by an inner diameter of the liquid cylinder to which the liquid piston is inserted and an inner diameter of the air cylinder to which the air piston is inserted. According to the exemplary embodiment of the present invention, therefore, the foam dispensing container 1 is configured to adjust the ratio of the square of the diameter of the air cylinder to the square of the diameter of the liquid cylinder to 15.5 or larger but 30.5 or smaller without uncertainty. That is, the foam dispensing container 1 is configured to adjust the above-mentioned ratio roughly between 16 to 30. In addition, as can be seen from the results of the comparative examples 2 and 3, sizes of the bubbles seriously affect an appearance of the foam. According to the exemplary embodiment of the present invention, therefore, the foam dispensing container 1 is configured to adjust the maximum diameter of the bubble to 450 μm or smaller, and to adjust the average diameter of the bubble to 200 μm or smaller.

As described, in the foregoing examples and comparative examples, "Biore Marshmallow Whip™" manufactured by Kao Corporation (viscosity: 12 mPa·s) was used as a sample to dispense a foam. However, results similar to the above-explained results of the examples were also achieved by using "Gokujyunn™" manufactured by ROHTO Pharmaceutical Co., Ltd. (viscosity: 7.3 mPa·s), and "Nameraka Honpo™" manufactured by TOKIWA Pharmaceutical Co., Ltd. (viscosity: 4.5 mPa·s).

Although the above exemplary embodiments of the present invention have been described, it will be understood that the present invention should not be limited to the described exemplary embodiments. As described, the present invention may be applied to the foam dispensing containers in which foamable liquid content and air are pushed out simultaneously to form a foam, and in which the foam is refined by the refining member. That is, the structures to achieve those functions should not be limited to those explained in the foregoing embodiment, and may be modified according to need in practical use.

The invention claimed is:

1. A foam dispensing container, comprising:

a cap that is mounted on an opening of a container containing a foamable liquid content;

a nozzle member having a discharging outlet from which a foam is discharged, that is fitted onto the cap while being allowed to reciprocate in an axial direction;

an air pump and a liquid pump reciprocated together with the nozzle member;

an air cylinder that is joined to the air pump in a liquid-tight manner and that pushes air toward the discharging outlet in response to a reciprocation of the air pump;

a liquid cylinder that is joined to the liquid pump in a liquid-tight manner and that pushes a liquid toward the discharging outlet in response to a reciprocation of the liquid pump;

a mixing chamber in which the liquid pushed out of the liquid cylinder is mixed with the air pushed out of the air cylinder; and a porous member that is arranged in the cap to form the foam, and to refine the foam, wherein:

a viscosity of the liquid is 4.5 mPa·s or greater but 12 mPa·s or smaller, the air cylinder and the liquid cylinder are individually shaped into a cylindrical member, and a ratio of a square of a diameter of the air cylinder to a square of a diameter of the liquid cylinder is 15.5 or larger but 30.5 or smaller, an expansion ratio as a volume ratio between the air pushed out of the air cylinder by pushing down the nozzle member and the liquid pushed out of the liquid cylinder by pushing down the nozzle member is 15.5 or greater but 30.5 or smaller, a density of the foam dispensed from the discharging outlet falls within a range of 0.03 g/cm$^3$ to 0.06 g/cm$^3$, and a maximum diameter of a bubble in the foam is 450 μm or smaller, and an average diameter of the bubble in the foam is 200 μm or smaller.

2. The foam dispensing container as claimed in claim 1, further comprising:

a net holder that is arranged in the cap to hold the porous member, wherein the porous member of 100 mesh is attached to a mixing chamber side of the net holder, and the porous member of 200 mesh is attached to a discharging outlet side of the net holder.

3. The foam dispensing container as claimed in claim 2, further comprising a net of 305 mesh that is arranged in the discharging outlet in front of an opening end.

4. The foam dispensing container as claimed in claim 1, further comprising a net of 305 mesh that is arranged in the discharging outlet in front of an opening end.

* * * * *